United States Patent [19]
Cumpston, Jr.

[11] 4,075,026
[45] Feb. 21, 1978

[54] MORTARS AND CONCRETES CONTAINING PRETREATED AGGREGATE FILLERS

[76] Inventor: Edward H. Cumpston, Jr., 43 Monument Ave., Old Bennington, Vt. 05201

[21] Appl. No.: 757,231

[22] Filed: Jan. 6, 1977

[51] Int. Cl.$^2$ .................................................. C04B 7/02
[52] U.S. Cl. ............................................ 106/97; 106/98
[58] Field of Search ......................................... 106/97, 98

[56] References Cited
U.S. PATENT DOCUMENTS 3,953,222  4/1976  Bainton ................................. 106/97

*Primary Examiner*—J. Poer
*Attorney, Agent, or Firm*—Morgan, Finnegan, Pine, Foley & Lee

[57] ABSTRACT

The present invention relates to cement compositions including both mortars and concretes and methods of making such compositions. The invention further concerns the discovery that mortars and concretes can be obtained with improved properties by including in their composition an aggregate filler ingredient which has been pretreated by an acidizing and de-acidizing process.

43 Claims, No Drawings

MORTARS AND CONCRETES CONTAINING PRETREATED AGGREGATE FILLERS

BACKGROUND OF THE INVENTION

Cement mortar and concrete compositions are well known and have been adapted for innumerable uses, from heavy construction materials as in concrete blocks, bricks, foundations for structures, columns for high story buildings, and road and highway materials to lighter construction materials including household bonding materials.

A mortar is generally a cement mixed with a fine aggregate filler and water. A concrete differs from a mortar in that it additionally contains a coarse aggregate filler. The most common cements used in mortars and concretes are hydraulic cements. These are cements that require water in order to cure or harden. The choice of the particular hydraulic cement depends upon the particular end use and properties desired. In describing the cement component used in accordance with this invention, conventional Portland cement will be referred to hereinafter as an illustrative example to simplify the description of the invention.

Aggregate fillers are included in mortars and concretes generally to economize the cost of the compositions as well as to reduce shrinkage of the compositions upon curing.

With respect to the economical aspects of using fillers, it is well known that conventional fillers are less expensive than cement components and so fillers generally increase the volume coverage of a given amount of cement.

Aggregate fillers, as used in conventional mortars and concretes, have been considered inert and passive components with respect to the properties of the cured mortar or concrete. The chemical make-up or physical structure of aggregate fillers, other than their particle size, has not been considered to appreciably improve the overall strength characteristics of a concrete or mortar product.

In the past, in order to improve the strength properties of a given mortar or concrete, attention has been directed to varying the ratios of the components and adding other materials.

It has now been discovered that a particular chemical treatment of conventional aggregate materials will substantially improve the compressive strength and other properties of mortars and concretes.

SUMMARY OF THE INVENTION

This invention is both surprising and unexpected in the discovery that the properties of concrete and mortar compositions can be considerably effected and improved by certain chemical treatments of heretofore known and conventionally used aggregate fillers. By the present invention it is now possible to formulate concrete and mortar compositions with increased compressive strength by an economical process whereby conventionally used aggregate fillers are pretreated by an acidizing process more fully described below.

Immediate advantages of the present invention include the ability to obtain high compressive strengths in mortars and concretes without the need to include expensive additives in the composition and utilize costly aerating equipment in preparing the composition. Furthermore, in accordance with the present invention, it is now possible to formulate concrete and mortar compositions to yield a given high compressive strength with unexpectedly low or reduced amounts of cement being present.

Another advantage of the present invention is the discovery of a process for preparing the new mortar and concrete compositions which is very reliable in that the cured product consistently achieves the desired final properties. Also, poor fillers which have not been considered as useful components in mortar and concrete compositions may now be made suitable for such purposes.

Accordingly, the present invention has the following objects:

It is an object of the present invention to provide new and improved mortar and concrete compositions.

It is another object of the present invention to provide new and improved mortar and concrete compositions and methods of preparing them, which compositions have improved compressive strengths.

It is a further object of the present invention to provide a more economical mortar or concrete composition wherein expensive components such as cement may be reduced and other additives may be replaced with comparatively inexpensive pretreated aggregate fillers.

It is still a further object of the present invention to provide an improved method for making construction materials from cement compositions.

It is still another object of the present invention to provide an additive or improved aggregate filler for use in mortar and concrete compositions, which additive is capable of substantially improving the properties, including compressive strength properties of mortars and concretes.

It is an additional object of the present invention to provide a new process for preparing a mortar or concrete with improved properties.

Other objects and advantages of the invention will be set forth in part hereinafter and in part will be obvious, herefrom, or may be learned by practice with the invention.

DETAILED DESCRIPTION OF THE INVENTION

According to the present invention there are provided improved cement-containing concrete and mortar compositions which comprise a cement, water and an aggregate filler wherein the improvement resides in the inclusion in such compositions of an aggregate filler which has been pretreated. The pretreatment of aggregate includes an acidizing step and a de-acidizing step. The acidizing step comprises contacting an aggregate filler material with an acidic medium. The de-acidizing step includes a treatment wherein acid associated with the aggregate from the acidizing step is effectively deactivated or counteracted so that such acid will not deleteriously effect the cement component which is subsequently added to formulate the mortar or concrete.

It is well known in the art that acidic materials detrimentally effect cements and their ability to cure properly. Therefore, acidic materials have intentionally been excluded from preparations of cement-containing compositions. The present invention recognizes this harmful effect of acids on cements. However, part of the discovery herein is that the advantages obtained by acid pretreatment of aggregate fillers far outweigh the need to carry out a step of counteracting the negative effects that the acidic materials have on cement components.

A preferred embodiment of the present invention is to carry out the acidizing treatment with two steps. The first step is contacting the aggregate with the acidic medium containing an organic or inorganic acid in such a manner as to maximize the surfaces of the aggregate contacted by the acid. The second is to cause the aggregate to remain in intimate contact with the acid, preferably in a static state, to assure a uniform treatment.

Another preferred embodiment of the present invention is to de-acidify the aggregate filler after the acidizing treatment to counteract the acid associated with the filler in order to eliminate any deleterious effect the acid may have on the cement. This de-acidizing treatment can be accomplished by chemical reaction with the acidic residuals or by physically removing a substantial portion of the acidic residuals from the aggregate. The chemical treatment of the acid residuals may be accomplished by converting the free acid to a passive material such as by the addition of an alkaline material in sufficient amounts and by a suitable method to substantially neutralize the acidic residuals. The physical removal or separation of the aggregate from the residual acid may be accomplished by careful washing of the aggregate prior to addition to the cement component.

The pretreatment of aggregate fillers in accordance with the present invention therefore includes an acidizing treatment and a de-acidizing treatment. Neither treatment alone has been found to result in the improved properties of mortars and concretes obtained by the sequential combination of these treatments.

The aggregate starting materials useful in the present invention include those materials generally and conventionally used in cement mortars and concretes. They have a wide range of particle sizes and include such materials as silica sand, bank gravel, and crushed stone. The particular particle size for the filler may be chosen based upon the standard factors known in the art.

The acidizing treatment of aggregate fillers in accordance with the present invention includes the step of contacting an aggregate material with an acidic medium and the step of reacting or allowing the aggregate to remain in contact with acid for an effective reaction period of time.

The acidic medium used to contact the aggregate material comprises an aqueous solution of an acid. It has been found that not all acids are equally effective in the process. Although various acids have been tested, it has been found that hydrochloric acid is most effective in consistently yielding improved compressive strengths in cured mortars and concretes. Therefore, hydrochloric acid has been used in extensive testing to determine optimum treatment techniques. Despite the extensive testing of only hydrochloric acid, it is believed that other acids can be used in accordance with the present invention.

The aggregate material may be contacted with the acid by a number of techniques. For example, the acid may be sprayed onto the aggregate or the aggregate may be immersed in an acid bath. The choice of the actual acid contacting technique may be best determined by the nature of the aggregate, e.g., its particle size, and the acid to aggregate treatment ratio. It has been found that best results are obtained by initially agitating or dynamically contacting or mixing the acid with the aggregate. It is believed dynamic mixing enables the acid medium to most efficiently contact the surfaces of the aggregate. This initial contacting should continue for a time sufficient to enable maximum wetting of the aggregate surfaces.

After initial contacting of the acid and aggregate, a static reaction period is preferred. During this period, the acid reacts with the surfaces of the aggregate. By maintaining static conditions during this reaction time, a more uniform reaction throughout the aggregate occurs.

The normality of the acid treatment solution or its acid concentration may vary widely although the volume of the acid treatment solution should be at least sufficient to wet the surfaces of the aggregate. An acid treatment solution having a normality in the range 0.4 N to 3.5 N is preferred. Optimum results have been obtained where the weight ratio of acid in solution to dry aggregate is in the range 500 to 5,000 ppm.

The actual principles or scientific bases for the results obtained by the pretreatment process of the present invention are not completely understood. One theory is that acid effects the surfaces of the aggregate in such a way that makes them more receptive to bonding with the cement. After treatment with acid, surfaces of the aggregate become discolored and appear roughened or etched. This change in the aggregate surface has been observed both in aggregates with old exposed surfaces such as bank gravel and in aggregates with newer surfaces, such as in crushed rocks and stones.

In order to reduce the deleterious effect the residual acid associated with the filler will have on cement, the acidized aggregate is de-acidified. This is accomplished by either causing a reaction with the acid to counteract its harmful effect on cement or by physically removing residual acid from the aggregate.

The acid residuals may be counteracted chemically by mixing an alkaline material with the acidized fillers. This substantially neutralizes the acid. An example of an alkaline material useful in this process is a solution of an alkaline metal hydroxide such as sodium hydroxide. In order to assure the greatest reduction in acid residuals, a dynamic or agitated mixing of the alkaline material with the acidized aggregate in solution is preferred. This maximizes the contact of alkaline material with acid residuals. While the amount of alkaline material to be used generally depends upon the acidizing treatment, a preferred weight ratio of alkaline material to dry aggregate is 100 to 3,000 ppm.

The concentration or amount of acid entrained or associated with the acidized aggregate also may be reduced physically, such as by washing techniques. This method is particularly effective when coarse aggregate is treated. Washing is not as effective for fine aggregates because of the tendency to wash away fine solids.

The reduction in acidic residuals associated with the aggregate may be accomplished by any one or a combination of the techniques described above or others which accomplish this stated purpose.

The relative proportions of the components in the mortars and concretes of the present invention are determined by factors known in the art. Illustrative ranges are: cement to filler by weight in the range 1:1 to 1:9; water present in the range 9–20% by weight of the solids present.

EXAMPLE 1

The concrete compositions whose properties are reported below illustrate the improvement in compressive strength of concretes achieved by the inclusion of pretreated aggregate fillers of the present invention.

Each of the concretes were prepared by mixing Portland cement, water and an aggregate filler in an electric portable power cement mixer. The concretes differed in preparation only in whether the aggregate filler was pretreated.

Where a filler was pretreated prior to the addition of any cement, an aqueous solution of hydrochloric acid was added to the aggregate filler in a cement mixer. This mixture was turned on for a period of 30 seconds to allow uniform contacting of aggregate with the acid and then the mixer was stopped. The aggregate was allowed to remain in contact with the acid solution in the cement mixer for a period of 30 minutes (30 minutes of static reaction time). Then, an alkaline solution containing sodium hydroxide was added to the mixture while the mixer was turned on. The period for dynamic alkaline contact was 5 minutes. After the alkaline solution dynamic contacting time, the cement component was added to the mixture. The water needed to make the concrete includes the water used in the pretreatment of the aggregate, namely, the water present in the acidic medium and alkaline solution. The materials were mixed to form a relatively uniform slurry composition. The relative proportions of ingredients and time periods for the respective steps were the same for each sample. Upon being mixed, each concrete sample was placed into various rectangular and cylindrical molds. After each sample was cured for periods of 7 and 28 days, under the same conditions, they were tested for compressive strength.

The aggregate fillers tested were Long Island natural sand, Appalachian crushed stone and bank gravel.

A. Pretreated Dry Sand and Crushed Stone

Reported below is the compressive strengths of two concrete samples, one containing pretreated aggregate, the other containing aggregate as received without pretreatment. The sand and crushed stone aggregate were oven dried prior to being pretreated in order to accurately control water content.

|  | Compressive Strength (psi) | |
| --- | --- | --- |
|  | 7 days cure | 28 days cure |
| Control (no pretreatment) | 4335 | 5330 |
| Pretreated aggregate | 5171 | 7283 |
| Change | +19% | +36.6% |

B. Pretreated As-Received Sand and Stone

In this test, the concrete sample containing pretreated sand and stone aggregate was pretreated without being previously oven dried:

|  | Compressive Strength (psi) | |
| --- | --- | --- |
|  | 7 days | 28 days |
| Control (no pretreatment) | 4335 | 5330 |
| Pretreated aggregate | 5250 | 6683 |
| Change | +21% | +25% |

C. Treat Sand and Stone Separately with HCl-Then Make Concrete

In the following samples, the sand and crushed stone were pretreated separately and afterward mixed together with the cement and water balance:

|  | Compressive Strength (psi) | |
| --- | --- | --- |
|  | 7 days | 28 days |
| Control (no pretreatment) | 4335 | 5330 |
| Pretreated aggregate | 4694 | 7080 |
| Change | +8.2% | +32.8% |

D. Pretreated Bank-run Gravel + Untreated Crushed Stone

In the following samples, the bank-run gravel and the crushed stone were treated together:

|  | Compressive Strength (psi) | |
| --- | --- | --- |
|  | 7 days | 28 days |
| Control | 4058 | 5012 |
| Pretreated gravel only | 5490 | 7160 |
| Change | +35% | +42.8% |

The above data shows that aggregate fillers which are pretreated with an acidizing and subsequent de-acidizing step before being combined with cement to form concrete can improve the compressive strength of the concrete in the order of 25 to 40%.

EXAMPLE 2

While wide ranges of acid concentrations in the treatment solution and broad ranges of acid treatment ratios of aggregates have been found useful in the present invention, varying these concentrations and ratios does have an effect on the compressive strength of cured concrete. Sample concretes were prepared in accordance with the procedure set forth in Example 1 above. Each sample was prepared in the same manner and with the same components with the exception of the amount of acid used in pretreating the aggregate. The following data shows that there is an optimum amount of acid which should be used in the treatment of aggregates:

| Acid Concentration of Treatment Solution | Amount of Acid Based on Dry Weight of Aggregate | Compressive Strength After 7 Day Cure |
| --- | --- | --- |
| 0 | 0 | 5030 psi |
| 0.65 N | 1100 ppm | 6105 psi |
| 1.24 N | 2200 ppm | 6145 psi |
| 2.61 N | 4400 ppm | 5815 psi |

EXAMPLE 3

The de-acidizing step of the pretreatment process of Example 1 is further examined in a series of tests which are reported below.

Aggregate materials were pretreated in accordance with the procedure described in Example 1 above. Each of the samples tested were comparably prepared with the exception of the amount of alkaline material used in the deacidizing step.

| NaOH Concentration of Basic Solution | Amount of NaOH Based on Dry Weight of Aggregate | Compressive Strength After | |
| --- | --- | --- | --- |
|  |  | 7 Day Cure | 28 Day cure |
| 0.86 N | 2425 ppm | 5515 psi | 6515 psi |
| 0.43 N | 1210 ppm | 5830 psi | 6830 psi |
| 0.11 N | 300 ppm | 5925 psi | 7115 psi |

The foregoing results indicate that there is an optimum amount of basic material to be used in the de-acidizing step. Generally, this optimum amount relates to the amount of acid residuals present with the aggregate. It is preferred that the alkaline material should be added in sufficient amount to neutralize the acid residuals. This is generally in the order of the equivalent molar amount of acid added during the acidizing step.

EXAMPLE 4

As indicated above, any portion of the filler component of a mortar or concrete may be pretreated in accordance with the present invention to obtain improved properties in the cured product. In addition, tests indicate that de-acidization by neutralization is more effective than de-acidization by washing although washing is effective.

In the table below, the compressive strengths of the samples are reported. Each of the concretes were prepared by the method generally described in Example 1. In sample 1, the aggregate, a mixture of sand and crushed stone, was not pretreated and was directly added to the cement and water to form a concrete. In sample 2, the sand and stone aggregates were pretreated wherein the de-acidization step comprised neutralizing with sodium hydroxide. In sample 3, the sand and stone were pretreated differently. Both aggregates were acidized with hydrochloric acid as in sample 2. However, in sample 3, only the acid treated sand was deacidized by neutralizing with sodium hydroxide. The stone was de-acidized by washing with water.

| Sample | Pre-Treatment of Aggregate | Compressive Strength After 7 Day Cure | 28 Day Cure |
|---|---|---|---|
| 1 | None | 4335 psi | 5330 psi |
| 2 | Acid Treat Sand & Stone and Neutralize Both | 5171 psi | 7283 psi |
| 3 | Acid Treat Sand and Neutralize, Acid Treat Stone & Wash Stone With Water | 4694 psi | 7080 psi |

What is claimed is:

1. A concrete or mortar composition comprising a cement, an aggregate filler and water wherein at least a portion of said aggregate filler is pretreated prior to being added to the composition by sequential acidization and de-acidization.

2. The composition of claim 1 wherein said cement is Portland cement.

3. The composition of claim 1 wherein the aggregate filler is selected from the group consisting of silica sand, crushed stone, gravel and mixtures thereof.

4. The composition of claim 1 wherein the ratio by weight of the cement to filler is in the range 1:1 to 1:9.

5. The composition of claim 5 wherein water is present in the range 9–20% by weight of the solids present.

6. The composition of claim 1 wherein the acidization of said filler comprises contacting said filler with an acidic medium contacting an aqueous solution of hydrochloric acid.

7. The composition of claim 1 wherein during said acidization the aggregate is initially contacted dynamically with the acidic medium and then further contacted statically.

8. The composition of claim 1 wherein the de-acidization of said filler comprises after acidization contacting the filler with an alkaline medium containing an aqueous solution of an alkaline material.

9. The composition of claim 8 wherein said alkaline material is sodium hydroxide.

10. The composition of claim 1 wherein said de-acidization of the aggregate filler is carried out dynamically.

11. The composition of claim 1 wherein said aggregate filler is de-acidized by being washed with water.

12. A process for preparing cement-containing mortar or concrete, said process comprising the steps:
  a. pretreating an aggregate filler by acidizing said aggregate filler with an acid medium and thereafter de-acidizing said filler by counteracting residual acid so that it does not deleteriously effect cement to be added, and
  b. mixing the pretreated aggregate filler with cement and water to balance.

13. The process of claim 12 wherein said acidic medium comprises an aqueous solution of an organic or inorganic acid.

14. The process of claim 13 wherein said acid is hydrochloric acid.

15. The process of claim 12 wherein the aggregate filler is acidized by spraying said acidic medium onto the surfaces of the aggregate filler.

16. The process of claim 12 wherein the aggregate filler is acidized by dynamically contacting said aggregate filler with said acidic medium by agitating said aggregate filler while in contact with the acidic medium.

17. The process of claim 16 wherein said acidized aggregate filler is allowed to further contact said acidic medium statically prior to being de-acidized.

18. The process of claim 12 wherein the aggregate filler is acidized whereby the treatment ratio of acid in the acidic medium to dry aggregate is in the range 500 to 5,000 ppm.

19. The process of claim 12 wherein the acidic medium comprises an aqueous solution of acid having a normality in the range 0.4 N to 3.5 N.

20. The process of claim 12 wherein said aggregate filler is de-acidized by washing so as to reduce the amount of residual acid associated with the pretreated aggregate filler.

21. The process of claim 12 wherein said acidized aggregate filler is de-acidized by contacting said acidized filler with an alkaline material having sufficient basicity and amount to counteract the deleterious effect of any residual acid on the cement.

22. The process of claim 21 wherein the alkaline material is selected from alkali metal hydroxides.

23. The process of claim 21 wherein said alkaline material is sodium hydroxide.

24. The process of claim 23 wherein said sodium hydroxide is present in solution in contact with the acidized aggregate filler within the weight ratio range of sodium hydroxide to dry aggregate of 100 to 3,000 ppm.

25. The process of claim 21 wherein the alkaline material is dynamically contacted with the acidized aggregate filler prior to being mixed with the cement.

26. The mortar or concrete produced by the process of claim 12.

27. The mortar or concrete produced by the process of claim 14.

28. The mortar or concrete produced by the process of claim 15.

29. The mortar or concrete produced by the process of claim 16.

30. The mortar or concrete produced by the process of claim 17.

31. The mortar or concrete produced by the process of claim 20.

32. The mortar or concrete produced by the process of claim 21.

33. The mortar or concrete produced by the process of claim 22.

34. The mortar or concrete produced by the process of claim 23.

35. The mortar or concrete produced by the process of claim 24.

36. The mortar or concrete produced by the process of claim 25.

37. A process for preparing a cement-containing mortar or concrete, said process comprising:
  a. acidizing an aggregate filler by contacting said aggregate filler with an aqueous solution of hydrochloric acid;
  b. de-acidizing the acidized filler by contacting said acidized filler in the hydrochloric acid solution with sodium hydroxide in sufficient amount to wet substantially all the surfaces of the acidized filler and counteract any deleterious effect caused by residual acid on cement to be added; and
  c. mixing the de-acidized filler with cement and water to balance to form the mortar or concrete.

38. The process of claim 37 wherein the filler is acidized by dynamically contacting the filler with said acid and thereafter allowing the acid and filler to remain in contact in a static state prior to de-acidizing.

39. The process of claim 38 wherein the weight ratio of acid to dry aggregate during acidizing is 500 to 5,000 ppm.

40. The process of claim 38 wherein the filler is de-acidized by dynamically contacting said acidized filler with sodium hydroxide.

41. The process of claim 40 wherein the weight ratio of sodium hydroxide to dry aggregate is in the range 100 to 4,000 ppm.

42. The process of claim 37 wherein the water present in the mixed mortar or concrete is in the range of 9–20% by weight of water to solids.

43. The process of claim 37 wherein the weight ratio of aggregate to cement is in the range 1:1 to 9:1.

* * * * *